US010572153B2

(12) United States Patent
Singhai et al.

(10) Patent No.: US 10,572,153 B2
(45) Date of Patent: Feb. 25, 2020

(54) EFFICIENT DATA MANAGEMENT THROUGH COMPRESSED DATA INTERFACES

(71) Applicant: Western Digital Technologies, Inc., San Jose, CA (US)

(72) Inventors: Ashish Singhai, Los Altos, CA (US); Ajith Kumar Battaje, Karnataka (IN); Sandeep Sharma, Karnataka (IN); Saurabh Manchanda, Delhi (IN)

(73) Assignee: Western Digital Technologies, Inc., San Jose, CA (US)

( * ) Notice: Subject to any disclaimer, the term of this patent is extended or adjusted under 35 U.S.C. 154(b) by 247 days.

(21) Appl. No.: 15/621,960

(22) Filed: Jun. 13, 2017

(65) Prior Publication Data

US 2018/0032261 A1    Feb. 1, 2018

Related U.S. Application Data

(60) Provisional application No. 62/366,897, filed on Jul. 26, 2016.

(51) Int. Cl.
*G06F 3/06* (2006.01)
*G06F 12/02* (2006.01)

(52) U.S. Cl.
CPC ............ *G06F 3/0608* (2013.01); *G06F 3/064* (2013.01); *G06F 3/0641* (2013.01);
(Continued)

(58) Field of Classification Search
CPC ...... G06F 3/0608; G06F 3/064; G06F 3/0641; G06F 3/0673; G06F 12/023; G06F 12/0292
See application file for complete search history.

(56) References Cited

U.S. PATENT DOCUMENTS 7,020,843 B2    3/2006   Hamlett et al.
7,962,706 B2    6/2011   Davis
(Continued)

OTHER PUBLICATIONS

Nagapramod Mandagere, Pin Zhou, Mark A Smith, and Sandeep Uttamchandani. Demystifying data deduplication. In Proceedings of the ACM/IFIP/USENIX Middleware '08 Conference Companion. ACM, New York, NY, USA, 12-17. (Year: 2008).*

(Continued)

*Primary Examiner* — Ramon A. Mercado
(74) *Attorney, Agent, or Firm* — Patent Law Works LLP

(57) ABSTRACT

A system and method for efficiently managing data through compression interfaces may include receiving, by a controller, data, generating, by the controller, a compressed payload based on the data, generating, by the controller, metadata describing the compressed payload, the metadata including fixed size metadata and variable size metadata, generating, by the controller, a data container comprising the uncompressed payload and the metadata, and transmitting, by the controller, the data container to an application. Some implementations of the system may include a storage media, and a storage controller executable by a processor that may include an interface processor, a controller logic, and a media processor configured to communicate with an application and the storage media to perform aspects of the method.

20 Claims, 6 Drawing Sheets

(52) U.S. Cl.
CPC .......... *G06F 3/0673* (2013.01); *G06F 12/023* (2013.01); *G06F 12/0292* (2013.01)

(56) References Cited

U.S. PATENT DOCUMENTS

| | | |
|---|---|---|
| 7,966,296 B2 | 6/2011 | Isobe |
| 8,433,823 B2 | 4/2013 | Hugly et al. |
| 8,473,699 B2 | 6/2013 | Browne et al. |
| 8,516,002 B2 | 8/2013 | Rao et al. |
| 8,620,147 B2 | 12/2013 | Lee et al. |
| 8,732,133 B2 | 5/2014 | Attarde et al. |
| 8,935,223 B2 | 1/2015 | Ganesh et al. |
| 9,112,888 B2 | 8/2015 | Singh |
| 9,116,908 B2 | 8/2015 | Fallon |
| 2006/0010151 A1 | 1/2006 | Star Sung |
| 2012/0089579 A1 | 4/2012 | Ranade et al. |
| 2014/0201316 A1 | 7/2014 | Chinn et al. |
| 2014/0281146 A1 | 9/2014 | Horn |
| 2014/0281167 A1 | 9/2014 | Danilak et al. |
| 2014/0281168 A1* | 9/2014 | Koseki ................ G06F 11/108 711/103 |
| 2014/0281302 A1* | 9/2014 | Horn .................... G06F 3/0656 711/161 |
| 2015/0067746 A1 | 3/2015 | Willis et al. |
| 2015/0227540 A1 | 8/2015 | Lin et al. |

OTHER PUBLICATIONS

Author Unknown "Disk Backup Deduplication Vendors Boost Performance and Features" dated Feb. 2012, 6 pages.

\* cited by examiner

EFFICIENT DATA MANAGEMENT THROUGH COMPRESSED DATA INTERFACES

CROSS REFERENCE TO RELATED APPLICATIONS

The present application claims priority, under 35 U.S.C. § 119, of U.S. Provisional Patent Application No. 62/366,897, filed Jul. 26, 2016 and entitled "Efficient Data Management Through Compressed Data Interfaces," which is incorporated by reference in its entirety.

BACKGROUND

The present disclosure relates to enabling use of compression capabilities of a storage device.

Classical data access interfaces involve reading and writing operations that operate on a user view of data or form of data used by applications. Some classical interfaces allow data to be reduced in a storage device view of data with respect to the user view of the data. However, existing classical read and write interfaces prescribed by various standard protocols provide applications with a view that is unaware of the presence of compression, so that transfers between storage devices and applications can only transfer uncompressed data.

Data reduction using compression in a storage device provides many benefits, such as increased storage capacity, increased performance, and increased endurance in the case of a limited endurance storage medium. However, standard block read and write interfaces prescribed by various standard protocols, such as SCSI (Small Computer System Interface) or NVM Express (Non-Volatile Memory Host Controller Interface Specification), provide applications with a view that is unaware of the presence of compression. When the data is not reduced, the application's view of the data is the same as the storage device's view of the data, however, when the data is reduced the application's view is different than the storage device's view.

Classical technology may provide validity check or protection information (e.g., using T10 DIF) on uncompressed data to verify the integrity of the uncompressed data; however, the validity check information computed on uncompressed data is not useful to verify the integrity of the compressed form of the data. For example, even if validity check information is computed for uncompressed data and the data is later compressed, the data must be decompressed before the validity can be checked using the validity check information for the uncompressed data.

There are applications which do not need to process the data itself but could still benefit from exchanging compressed data with a storage device. However, existing solutions are generally unable to efficiently use data in its compressed form. The present disclosure solves problems impeding such use of compressed data by enabling new interfaces for communication between a storage device and an application.

SUMMARY

The techniques described in the present disclosure relate to systems and methods for efficient data management with compressed interfaces. According to one innovative aspect of the subject matter in this disclosure, a system for efficiently managing data through compression interfaces comprises a non-transitory storage medium for storing and providing access to data; an interface processor coupled to an application, the interface processor receiving a write request from the application, the write request including compressed data; a controller logic coupled to an output of the interface processor, the controller logic receiving, from the output of the interface processor, the compressed data, and responsive to receiving the compressed data, generating a data container having a data container format including a compressed payload and metadata, the compressed payload including the compressed data, the metadata including fixed size metadata and variable size metadata; and a media processor coupled to an output of the controller logic, the media processor receiving the data container generated by the controller logic via the output of the controller logic, and responsive to receiving the data container, storing the data in the non-transitory storage medium.

Other implementations of one or more of these aspects include corresponding systems, apparatus, and computer programs, configured to perform the actions of systems and methods, encoded on computer storage devices.

These and other implementations may each optionally include one or more of the following features: that the fixed size metadata includes data that is opaque to the application and the variable size metadata includes data interpretable by the application; that the metadata includes validity check information for verifying the integrity of the compressed payload, the validity check information for verifying the integrity of the compressed payload being configured to be interpreted by the application; that the metadata includes validity check information for verifying the integrity of an uncompressed form of the compressed payload, the validity check information for verifying the integrity an uncompressed form of the compressed payload being configured to be opaque to the application; that generating a compressed payload includes encoding, by the controller, the data into the compressed payload using data deduplication; that encoding the data into the compressed payload includes processing a data block of the data, the data block comprising a plurality of pieces of data; determining whether a second piece of data of the plurality of pieces of data has a first threshold level of similarity to a first piece of data of the plurality of pieces of data; determining whether the second piece of data has a second threshold level of similarity to a reference block, the reference block representing a piece of data that is not in the data block; and encoding the data block based on the determination that the second piece of data has the first threshold level of similarity to the first piece of data and the determination that the second piece of data has the second threshold level of similarity to the reference block; that the interface processor is executable to receive a query from the application for a stream of data, the stream of data including the compressed data; the controller logic is executable to determine an oldest reference set for the compressed data, the oldest reference set including at least one reference block; insert the at least one reference block of the oldest reference set into the variable size metadata; and construct one or more second data containers using data blocks that refer to the oldest reference set; and the interface processor is executable to transmit the one or more second data containers to the application; that the controller logic is further executable to, in response to all data blocks referring to the oldest reference set being inserted into the one or more second data containers, determine a next oldest reference set, the next oldest reference set including at least one second reference blocks, insert the at least one second reference blocks of the next oldest reference set into the variable size metadata, and insert data blocks that refer to the next oldest reference set into the one or more second data containers; and that the fixed size metadata includes data that is interpretable by the application to allow the application to interpret the variable size metadata.

These implementations are particularly advantageous in a number of respects. For instance, the techniques described in the present disclosure provide richer interfaces to access the functionality of a storage device, which allows applications to benefit from the ability to interact with compressed data. Additionally, the techniques described herein reduce network bandwidth consumption, reduced storage consumption, faster backups, and lower latency replications.

Implementations of the techniques described herein reduce network bandwidth consumption for replication and backup applications. They may reduce storage consumption, especially on secondary media for backup applications. They may enable faster backups, thereby reducing backup windows where applications may have to be taken offline. Additionally, they may enable lower latency replications allowing synchronous mirrored requests to be acknowledged faster.

It should be understood that language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
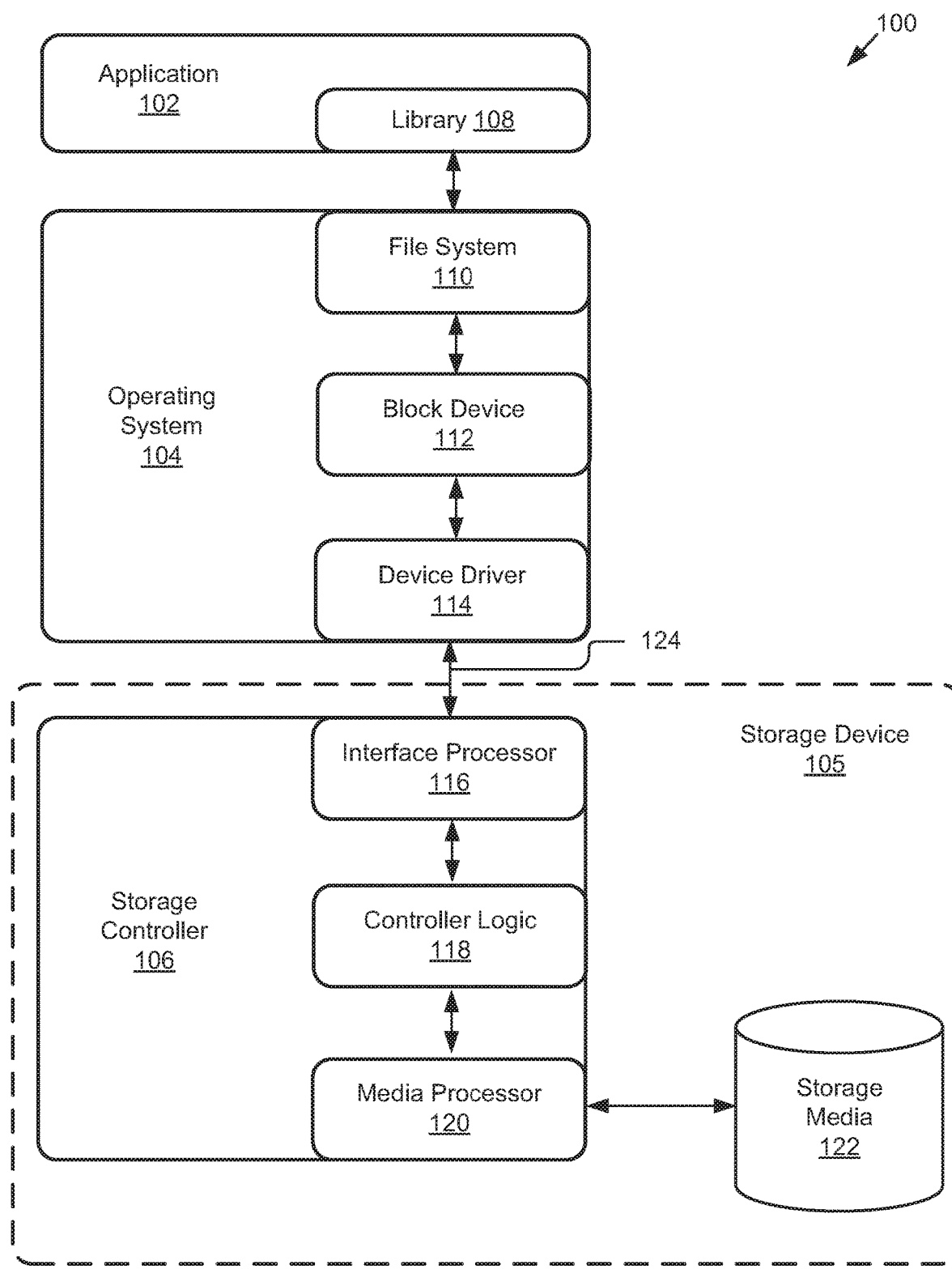
FIG. 1 is a block diagram illustrating an example system for efficient data management through compressed data interfaces.

As described in the Background, applications are typically unable to interact with or consume compressed data, but there is a class of applications that can benefit from exchanging compressed data with a storage device 105, even if those applications do not process the compressed data itself. For applications that do not need to consume the data itself, it is desirable to use the compressed data without decoding it in order to reduce bandwidth and storage consumption. The technology described by this disclosure addresses the problems described in the Background by providing compressed data interfaces allowing access and interaction by an application with compressed data on a data storage device (e.g., a storage device 105 may include, for example, a storage controller 106 and associated storage media 122). For instance, the techniques described herein include a model where such applications can work with compressed data by employing one or more of the following elements: new interfaces and associated operations for reading and writing compressed data, application interface support for invoking the new commands/operations, storage controller support for the new operations, validity checks on compressed data, and attaching logical block attributes to compressed data.

Innovative technology for efficiently managing data through compressed data interfaces is described below. While the technology is described in the context of particular system architecture, it should be understood that the systems and methods can be applied to other architectures, organizations of hardware, and memory devices with similar properties.

Among the interfaces introduced herein are storage operations (e.g., operations that write data to or read data from a storage medium) that read compressed data and write compressed data, similar to a classical read and write, but operating on a reduced form of the data. For example, a backup application may read data in compressed form during backup and then write compressed data during a restore without the backup application ever having to decompress the data or interact with uncompressed data. It should be noted that the new read compressed and write compressed interfaces can be intermixed with standard read and write interfaces. For example, an application may write a user view (e.g., uncompressed) of the data and then read the compressed version back, which may be useful for backup or replication applications.

For the purposes of this description, the terms "reduced" and "compressed" and their derivatives may be used interchangeably to refer to a compression of data into a smaller size. Some implementations of data reduction may include specific compression and/or deduplication techniques.

Also among interfaces introduced herein are application interfaces and operations, such as a compress buffer interface and a decompress buffer interface. In some implementations, a compress and/or decompress buffer may include operations that use the compression capabilities of the storage controller 106, but do not write data to the storage media 122 and/or read data from the storage media 122. For instance, these interface(s) may treat the compression capabilities of the storage device 105 as a service rather than a storage operation, in some cases. For example, a compress buffer and/or decompress buffer may provide an interface with the storage controller, so the storage controller 106 may perform the compression or decompression service and return the compressed or uncompressed data without necessarily writing the compressed or uncompressed data to the storage media 122. Some existing storage devices already support compression or decompression and the techniques described herein allow the compression or decompression capabilities of a storage device 105 to be accessed using the new interfaces.

Some implementations of the support for the application interface(s) (e.g., support for invoking the new commands and operations) may include end-to-end interfaces for interacting with the reduced form of the data, although direct access and control of the storage device 105 is also possible. In some instances, the system 100 includes application library 108 support, operating system 104 support, device driver 114 support, and/or interface protocol 124 support. A system including one or more of these support elements can have the reduced form of data in each portion of storage as needed. For example, deduplication support may be provided on both the read and write side of interfaces for the operating system 104, device driver 114, interface protocol 124, etc.

In some implementations, the storage controller 106 may support new operations including access to raw data and access to reduced data. Some implementations may provide extra information describing the reduced data, such as the length of the reduced data and, in instances where multiple data blocks are encoded, the boundaries of the data blocks, as described in further detail elsewhere herein. Some implementations may also or alternatively provide information for checking the validity of uncompressed data and/or compressed data. These and other implementations are described in detail throughout this disclosure.

Advantageously, the techniques described herein provide for validity check information that may be attached to a compressed payload 210 and used to verify the integrity of the compressed payload 210 even without decompressing the data in the payload, unlike the solutions described in the Background. For example, a storage controller 106 or other component of a computing system (e.g., system 100 in FIG. 1) may compute validity check information for the compressed payload 210 (e.g., in addition to or in place of the validity check information on the uncompressed form of the compressed payload), which may later be used to verify the compressed payload 210.

In some implementations, logical block attributes may be attached to data to allow the data and/or the attributes to be used by an application. For example, an uncompressed logical data block may be associated with attributes representing access statistics, locality hints, application data, etc. In some instances, when a data block is compressed, the attributes become unavailable, not useful, and/or are not transmitted with the compressed data block. Accordingly, in some implementations, logical block attributes may be attached to compressed data to allow an application to interact with the compressed data, the attributes, or even to reproduce the original uncompressed data.

For instance, a data format (e.g., a container 202) may be generated in which attributes may be transmitted along with the compressed data that they describe. Advantageously, attaching these attributes as metadata (e.g., uncompressed metadata) may allow certain applications to use the data without having to decompress the data. Additionally, the data format may enable the original data block and its attributes to be recreated even after it has been transferred to a different location or storage device 105. These recreated attributes, such as validity check information, compression or deduplication information, etc., may be used to recreate the original data, as described elsewhere herein.

FIG. 1 is a block diagram illustrating an example system 100 for efficient data management through compressed data interfaces. The system 100 may be a storage device, a computing device including a storage device 105, a distributed storage device, or other such devices capable of receiving and storing data. The system 100 may include one or more of an application 102, an operating system 104, a storage controller 106, and storage media 122, which may be distributed across multiple devices or present in a single device. For example, in some implementations, the application 102 and operating system 104 are present in a computing device. In some implementations, the storage controller 106 and the storage media 122 are present in a storage device 105.

Although not illustrated in FIG. 1, the system 100 may also include one or more memory(ies) that may store and provide access to one or more of the components of the system 100, one or more processor(s) that may process instructions to implement functionality described herein, and one or more bus(es) for providing communication between one or more of the components of the system 100.

A memory includes a non-transitory computer-usable (e.g., readable, writeable, etc.) medium, which can be any non-transitory apparatus or device that can contain, store, communicate, propagate or transport instructions, data, computer programs, software, code, routines, etc., for processing by or in connection with a processor. The memory may store instructions and data, including, for example, an operating system 104, hardware drivers, other software applications, modules, components of the system 100, etc. In some implementations, the memory may include dynamic random access memory (DRAM) device, a static random access memory (SRAM) device, or some other memory devices.

A processor may execute instructions by performing various input, logical, and/or mathematical operations. The processor may have various computing architectures to process data signals including, for example, a complex instruction set computer (CISC) architecture, a reduced instruction set computer (RISC) architecture, and/or an architecture implementing a combination of instruction sets. A processor may be physical and/or virtual, and may include a single core or plurality of processing units and/or cores.

A bus 124 may include a communication bus for transferring data between components of a system 100 or between computing devices, a network bus system including a network or portions thereof, a processor mesh, a combination thereof, etc.

Although FIG. 1 only illustrates a single application 102, operating system 104, storage controller 106, and storage media 122, it should be understood that different quantities of these and other components may be present in the system 100.

The application 102 may include software, code, or routines, or some combination thereof, for performing operations on data. The application 102 represents any application that may use the new interfaces and techniques described herein. Many applications 102 can reduce storage and network requirements if the compressed form of data is made available to the applications 102. For example, the application 102 may include a backup application that can cause the compressed form of the data to be stored and cause the data (e.g., in compressed or uncompressed form) to be restored back to a computing device or storage device 105. The application 102 may include a high availability application that can reduce replication traffic if the compressed form of data is used for replication (e.g., compressed data is replicated between storage media). In some implementations, the application 102 may include other applications that use compression for purposes other than storage (e.g., DRAM compression), although other implementations of the application 102 are possible and contemplated. For example, the compress buffer and uncompressed buffer interfaces may provide compression as a service to an application 102. For example, an NVME SSD (Non-Volatile Memory Host Solid State Drive) that supports compression/decompression may be used for storage (e.g., as a storage device 105), and the compress buffer and uncompress buffer would allow the NVME SSD card to be used as a compression offload device that performs compression and decompression operations as a service, as described elsewhere herein, thereby offloading CPU activity.

Backup applications are generally concerned with retrieving and restoring data from a storage device 105, but they generally do not interpret the contents of a file. Although some backup applications perform their own compression (e.g., using a CPU of a computing device, rather than the storage controller 106) to reduce storage consumption and speed up the access to the backup media, both of these benefits can be realized in a more efficient manner by reading compressed data (e.g., for backup) and writing compressed data (e.g., for restore). For example, by the application 102 using the compression/decompression capability of the storage controller 106, the resources of the processor associated with the application 102 and/or operating system 104 are not taxed with compression/decompression.

High availability storage services or applications may replicate data from one storage node (e.g., a storage node may include a physical server having one or more storage devices 105) to another storage node to ensure availability of the data. For instance, such services can use standard write and read compressed interfaces to benefit from reduced latency of transmission, reduced network bandwidth for replication, reduced electrical power consumption for compression by a remote device, and reduced latency when writing to a mirrored device. A high availability application may replicate data between a primary storage device 105 (e.g., which may include a storage controller 106 and/or storage media 122) and a secondary storage device. For example, a high availability application may send 4 kilobytes of data to the storage controller 106, which may compress the data according to the techniques described herein to 2 kilobytes of compressed data, which may then be read back to the high availability application in compressed form, and transferred to a secondary storage medium while still in the compressed form.

Some implementations of the application 102 may use data reduction for purposes other than storage, such as DRAM compression or stream compression. The interfaces described herein, such as the application interfaces and operations, may be used by these applications 102 to access the compression or decompression ability of a storage device 105 (e.g., the storage controller 106). For example, the compress buffer and decompress buffer interfaces allow such an application 102 to use the compression and decompression capability of a storage device 105 without necessarily writing data to the storage media 122.

As illustrated in FIG. 1, some implementations of the application 102 include or have a library 108 associated therewith. For instance, the application 102 invokes operating system services through a library 108 that provides access functions. For the new interfaces, application library support may be provided, so that the application 102 has a simple way to invoke the new operations. The library 108 may include support for the creation of a pathway for the application 102, so that it can invoke the new interfaces, for example, using familiar application programming methods and interfaces. For instance, the library 108 may to support application level access, such as sending requests for the new operations.

The operating system 104 may include software, code, or routines, or some combination thereof, for managing computer resources. An operating system 104 can mediate the access to storage and provides higher-level abstractions for applications, like block devices and file systems. The operating system 104 may support the new interfaces, for example, by providing access controls for the new operations. In some implementations, the techniques described herein may be implemented using the operating system 104 or using direct access to the storage controller 106.

In the depicted implementation, the operating system 104 includes a file system 110, a block device 112, and a device driver 114, although other implementations are possible. The file system 110 controls how data is stored, organized, and retrieved by the operating system 104. The block device 112 may organize data into specified blocks of data (e.g., fixed-size data blocks). The device driver 114 may include an interface to access storage devices and systems. For example, the device driver 114 may facilitate interaction with the storage controller 106 via the storage protocol 124. The device drivers may be extended to add new operation types to support the interfaces described herein.

The storage protocol 124 provides for communication between the application 102 and/or operating system 104 and the storage device 105 (e.g., the storage controller 106 and storage media 122). The storage protocol 124 may include protocols such as SCSI, NVM Express, etc., and may be extended to support the new interfaces. In particular, the storage protocol 124 may be extended to support issuing new commands for operations (e.g., requests for the new interfaces/operations described herein). Similarly, the storage protocol 124 may be configured to transmit additional information, such as compressed data, fixed size metadata 204, etc., to an application 102 corresponding to the requests and operations described herein. In some implementations, a new protocol may be designed to implement the functionality of the storage protocol 124. In some implementations, existing protocols, such as SCSI or NVM Express, may be extended with new commands to implement the functionality of the storage protocol 124. In some implementations, existing commands may be repurposed to express the new commands, or vendor unique commands may be used to implement the functionality of the storage protocol 124. For example, NVM Express extensions may be used to invoke the new commands.

The storage controller 106 may include hardware, logic, firmware, software, code, routines, or some combination thereof for implementing functionality to support the new operations of the interfaces described herein. In some implementations, the storage controller 106 may be integrated with the storage media 122 in a storage device 105. The storage controller 106 may implement the functions that permit compressed data access in addition to traditional uncompressed data access. The storage controller 106 may include an interface processor 116, controller logic 118, and a media processor 120, although additional or fewer components are possible and contemplated.

The interface processor 116 may be operable on the front end to receive data requests (e.g., data transfer requests, SCSI requests, etc.) from the clients of the storage device 105. For example, the interface processor 116 may receive requests from an application 102 or a device driver 114 as described elsewhere herein.

In some implementations, the controller logic 118 may transform requests from the interface processor 116 into operations on the storage media 122. For example, the controller logic 118 may convert requests (e.g., a SCSI request) to an internal address (e.g., physical address of the storage media 122). In some implementations, the controller logic 118 may be configured to compress or decompress data, for example, the controller logic 118 may be configured to deduplicate and reduplicate data, as described elsewhere herein.

The media processor 120 may be responsible for interacting with the storage media 122 to carry out the desired operation corresponding to the request. For example, in the case of a read operation on the storage media 122, the media processor 120 may drive the electronic circuitry to produce the desired data from a computed internal address. In some implementations, where the requested operation is a compress or decompress buffer, components other than the media processor 120 may be used.

To illustrate an example interaction between the components of the storage controller 106, if the storage controller 106 had received a standard read request, the media processor 120 may read the compressed data from the storage media 122, the controller logic 118 may decompress the compressed data and pass it to the interface processor 116, and the interface processor 116 may return the decompressed data to the application 102.

Some enhanced operations performed by the storage controller 106 can be illustrated with a discussion of read operations. For example, a request for a standard read may include a target read address and the number of blocks to be read. The returned value may include uncompressed data and the status (e.g., success or failure) of the requested operation. In instances where the request is for a read compressed operation, extra information may be returned to the application 102 in addition to the compressed data and the operation status. For example, the extra information may include the actual length of the returned compressed data and/or the location of the block boundaries (e.g., if more than one data block is being read in a single operation). For example, a read compressed request for two blocks of 4096 bytes from each address X may return a total length=2000 and boundaries at <0,500>, which means that the total returned data length (e.g., of the compressed data) is 2000 bytes, the first block begins at offset 0 and the second block begins at offset 500.

The storage media 122 may include one or more non-transitory computer readable storage mediums capable of storing data. While the storage media 122 may be described herein as flash memory, it should be understood that other implementations are possible and contemplated in the techniques of this disclosure. For example, the storage media 122 may include media such as a flash memory, electronic random access memory (RAM), magnetic disk or tape, optical disk, micro-electro mechanical, and/or any other similar media adapted to store information.

Figure 2:
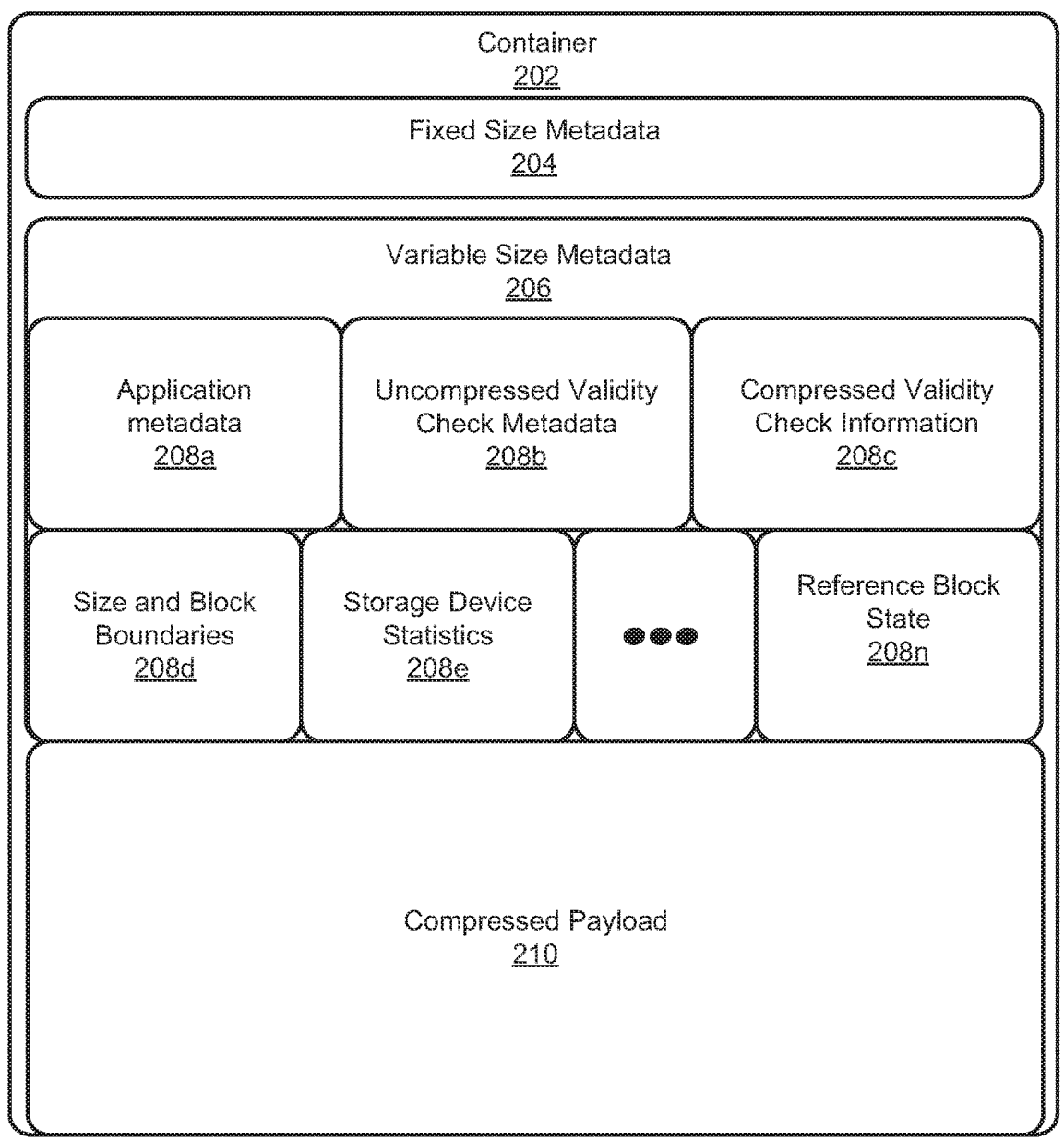
FIG. 2 is a graphical representation illustrating an example data format for transferring and allowing application level interaction with data in its compressed form.

FIG. 2 is a graphical representation illustrating a data format 200 according to the techniques described herein. The format 200 may capture the data items needed to retrieve compressed data and supply uncompressed data back to a storage device 105. In some implementations, the format 200 may include a container 202, which is a data structure including a compressed payload 210 and metadata. The metadata may include fixed size metadata 204 and variable size metadata 206, however, it should be understood that implementations of the techniques described herein may arrange the types of metadata differently or include different data in each of the fixed size metadata 204 and variable size metadata 206 without departing from the scope of this disclosure.

A logical data block in uncompressed form may be associated with certain metadata items that track attributes/properties of the data block, such as access statistics, locality hints, garbage collection hints, reference counts, CRC (cyclic redundancy check) checksums on uncompressed data, and so forth. An application 102 that reads such data (whether compressed or uncompressed) may expect to get all of these extended attributes in addition to the basic application data block. Hence the data format 200 may allow the data plus attributes to be transferred through read or write compressed interfaces.

The metadata 204 and/or 206 may be attached to the compressed payload 210 (e.g., by the storage controller 106) when the compressed payload 210 is transmitted in compressed form (e.g., before transmission, the metadata and payload are combined into container 202). The metadata 204 and 206 includes attributes in either compressed or uncompressed form (e.g., as described elsewhere herein) of the compressed payload 210 (e.g., in compressed and/or uncompressed form), which attributes may be used to recreate the original data that is compressed into the compressed payload 210. Additionally, as described herein, the attributes attached as metadata 204 or 206 may allow an application 102 to interact with (e.g., backup, restore, mirror, etc.) the compressed payload 210 without decompressing the data of the compressed payload 210.

In some implementations, the fixed size metadata 204 may describe the structure of the container 202, so that an application 102 is able to interpret container contents. In some implementations, the fixed size metadata 204 may include information that is opaque to an application 102. For instance, fixed size metadata 204 may include attributes, such as access statistics, locality hints, etc., some of which may be opaque to the application, that may be used to restore the original data, for example.

The variable size metadata 206 may include data that may generally be interpreted by an application 102. In some implementations, an application 102 may attach metadata of various types to a data item, for example, to each data block. For example, the variable size metadata 206 may be defined per data block and divided into application metadata 208a and protection information (e.g., validity check information), such as T10 DIF (Data Integrity Field). In some implementations, the application metadata 208a may be defined on uncompressed data (e.g., the uncompressed version of the compressed payload 210) in view of existing storage models. For example, application metadata 208a may include attributes, such as a hotness of a block (e.g., the hotness may indicate how frequently the block is accessed), an NVME stream ID that allows the application 102 to communicate which data blocks are related, thereby allowing the storage device 105 to optimize the placement of data, for instance, for garbage collection efficiency purposes.

In some implementations, the application metadata 208a may be opaque (e.g., not useable by the storage controller 106) to the storage device 105 and interpreted by the application 102. The storage device 105 may maintain and supply the data contained in the application metadata 208a for when the application 102 reads a data block. In some implementations, the container 202 structure may allow the application 102 to retrieve the application metadata 208a even when, for example, the application 102 reads or retrieves data using a read compressed interface, as described elsewhere herein. For instance, the application metadata 208a may be generated and configured in the storage container 202 to allow access by the application 102 even when the compressed payload 210 is not accessible by the application 102 (e.g., due to compression). For example, the application 102 could be using the storage device 105 as a key-value storage (e.g., such as where a user ID is a key and a value is homepage content of the user on a social media website). In this example, the key may be supplied to the storage controller 106 to read data in compressed form (e.g., using the read compressed interface) and decreasing the amount of data transmitted to the application 102. The key may accordingly allow the application 102 to interpret the application metadata 208a (e.g., the user ID) and selectively read uncompressed data using, for instance, the uncompress buffer interface if the application 102 determines that the corresponding data is of interest based on the application metadata 208a. It should be noted that this use case is provided as an example of variable size metadata 206 organized in a container 202 structure, but other implementations are possible.

In some implementations, the variable size metadata 206 may include uncompressed validity check metadata 208b. For example, in a data reduction enabled storage device 105, validity check metadata may include validity check information (e.g., cyclic redundancy code, T10 DIF, etc.) calculated based on uncompressed data, so that uncompressed data may be verified (e.g., after transmission or reception in the system 100 or over a network, retrieval from the storage media 122, etc.). In some implementations, the validity check metadata 208c may not be, itself, compressed. For example, a standard write operation that supplies uncompressed data to a storage device 105 may also provide uncompressed validity check metadata 208b on the uncompressed data. The uncompressed data may be compressed into the compressed payload 210, transmitted to another computing device along with the fixed size metadata 204 and variable size metadata 206 in the container, and decompressed back into the uncompressed data, which may then be checked using the uncompressed validity check metadata 208b.

As described elsewhere herein, uncompressed validity check metadata 208b may not be useful, in some cases, on a compressed form of the data, so compressed validity check metadata 208c may be provided in the container 202 to check the validity of the compressed form of the data (e.g., the compressed payload). An interface supplying compressed data may generate and check compressed validity check metadata 208c based on the compressed form of the data (e.g., the compressed payload 210). For instance, a receiving computing device may check the compressed validity check metadata 208c to verify the integrity of a transmitted compressed payload 210.

In some implementations, the application 102 may attach validity check metadata (e.g., T10 DIF) to each block that it writes to a storage device 105. The validity check metadata may be used to verify the validity of data received from the storage device 105 during a read operation. Using the new interfaces, such as read compressed, the application 102 may be able to validate the contents of read data even if the data is read in compressed form.

In some implementations, the container 202 structure may enable an application 102 to perform a validity check on compressed data. For example, an application 102 may submit a block of data (e.g., via a regular write operation), and the storage controller 106 may compress the data, generate validity check information on the compressed data (e.g., using cyclic redundancy check), and store the compressed data along with its validity check information, for instance, in the storage media 122. The application 102 may then issue a read compressed request, in response to which, the storage controller reads the data in compressed form, packs the data into the container 202 structure, puts in compressed data validity check information into the variable size metadata 206 (e.g., in the metadata 208b or 208c) portion of the container 202, and transmits the container 202 to the application 102. The application 102 may then perform a validity check on the compressed data (e.g., before doing further processing of the container 202 or compressed data). For example, the validity check may be implemented by a software development kit (SDK) supplied by a storage device 105 vendor.

In some implementations, the variable size metadata 206 may include size and block boundaries 208d. In particular, even if the size of an uncompressed data block is constant, the length of the reduced form is not constant, so the length of the compressed version may be returned to the application 102 as metadata. For example, as described above, the application 102 may use the size of the compressed payload 210 and may use the location of the block boundaries when more than one data block is being read in a single operation. In some implementations, a container 202 may hold compressed data from multiple data blocks and hence the size and block boundaries 208d of the compressed data corresponding to each uncompressed block may allow an application 102 co correlate compressed data to corresponding block numbers.

In some implementations, the variable size metadata 206 may include storage device statistics 208e. For example storage statistics may be attached by the storage controller 106. The storage device statistics may include various attributes attached to a data block that helps the storage controller 106 to efficiently manage the lifecycle of the data block. For example, a data block that is frequently read could be marked as "red-hot," or frequently used, by a storage device. When a use case, such as a backup application, backs up this data, the fixed size metadata 204 may act as a placeholder to store the storage device statistics 208e. The storage device statistics 208e may then be restored during a backup restore. The storage device statistics 208e may be used during the read compressed and write compressed operations, for instance, to backup and restore data without losing statistics managed by a storage device.

In some implementations, the variable size metadata 206 and/or the fixed size metadata 204 may include a reference block state 208n. For instance, in implementations where the storage device 105 supports deduplication, reference block state may be used to restore compressed or deduplicated data. The reference block state 208n includes reference block information relating to one or more reference blocks that are used to compress the compressed payload 210. The reference block state 208n may include data that indicates which reference blocks were used for compression/deduplication, reference block data, a pointer, an index, another instruction to retrieve the reference block, etc. Reference blocks and their states are described in further detail in reference to FIG. 4.

The reference block state 208n may be relevant, for instance, in the context where the application 102 includes backup application. For example, in some implementations, the backup application may query the storage device 105 for a stream of data to back up in compressed form (e.g., as when retrieving data directly from the storage media 122 in compressed form and transmitting the compressed data to another storage device 122 in the data container 202). The storage controller 106 may search for the oldest reference set R0 and fill the valid reference blocks from this reference set into the variable size metadata 206 portion of the container 202. The storage controller 106 further constructs container(s) 202 with data that refer to the reference set R0 (e.g., by inserting the compressed data into the compressed payload 210). Once all data blocks corresponding to the reference set R0 are filled in, the storage controller 106 may construct a container with valid reference blocks from the next oldest reference set R1 and the process repeats with R1 and subsequent reference sets. These operations may allow a backup application to capture the state of a deduplication enabled storage device 105 in a way that is efficient, for example, by not repeating reference blocks. Accordingly, data can be backed up from one storage device 105 to another storage device 105 in compressed form and while maintaining access to reference blocks for deduplication and undeduplication.

Deduplication may include delta deduplication. Delta deduplication may use a reference set of n data blocks as reference data during deduplication. The reference set may evolve over time based on a workload pattern, for example, of data as it is deduplicated. Each reference block in the reference set may be summarized by a signature, which may be computed using, for example, the MinHash technique (a known technique for estimating how similar two sets are) and Rabin Fingerprinting. Delta deduplication may include a process where the signature of a data block that is to be deduplicated may be looked up in the reference set block signatures to identify the most identical candidate reference block. The candidate reference block may then be used to deduplicate the contents of the data block. The original data block may be reconstructed using the reference block. Accordingly, the reference block is made available for reduplication.

In some implementations, to provide access to the reference block during delta deduplication, additional interfaces may be provided to read and restore reference sets. For example, the interfaces may include Get Reference Set to provide a dump of a reference set with all active reference blocks and Set Reference Set to setup the reference set for delta deduplication.

The compressed payload 210 includes the data described by the metadata 204 and 206, for example, the metadata 204 and 206 may describe either the compressed payload 210 or the uncompressed form of the compressed payload 210. The compressed payload 210 may be encoded using various compression methods such as deduplication (e.g., delta deduplication), but other forms of compression are possible. An example method 400 of deduplication is described in reference to FIG. 4.

Figure 3:
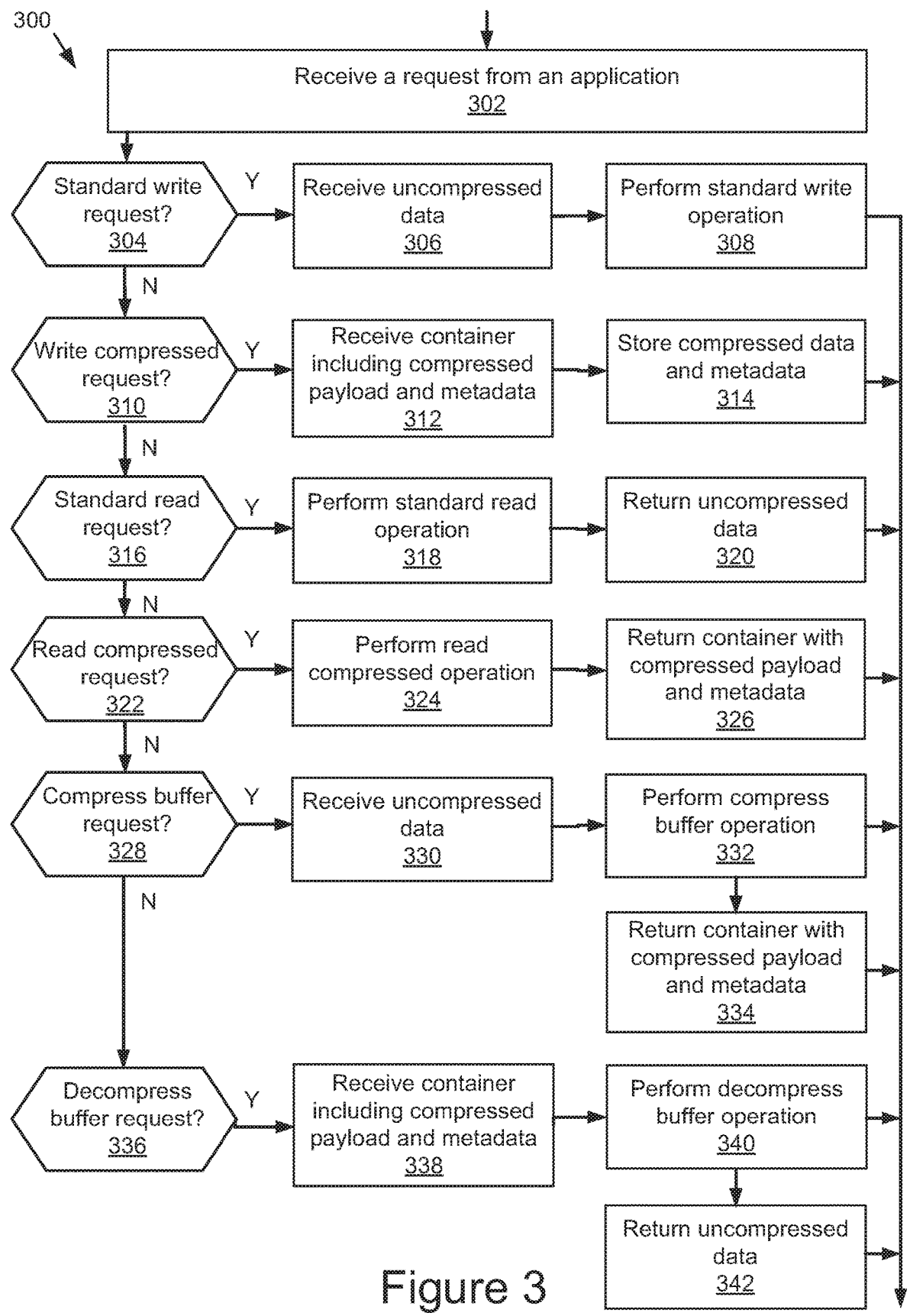
FIG. 3 is a flow chart of an example method for calling the interfaces and operations for providing efficient data management through compressed data interfaces.

FIG. 3 is a flow chart of a method 300 for calling the interfaces and operations for providing efficient data management through compressed data interfaces. While the method 300 is described as being performed by the storage controller 106, it should be understood that one or more of the operations of the method 300 may be performed by and/or distributed across other the components of the system 100.

Under the method 300, in addition to performing read and write operations, the interface processor 116 can read and/or write compressed data, and/or access the compression and decompression capability of a storage device 105. The interface processor 116 can intermix compressed and uncompressed read and write operations. For example, the interface processor 116 can write data and then read it back in uncompressed form (e.g., a standard read operation) as well as read it back in compressed form (e.g., a read compressed operation). Similarly, the interface processor 116 can write data in compressed form (e.g., write compressed) and read it back in uncompressed form (e.g., standard read) or compressed form (e.g., read compressed). Additionally, the interface processor 116 may include application interfaces, such as interfaces that use the capabilities of the storage controller 106 as a service without writing data to or reading data from the storage media 122, such as a compress buffer and a decompress buffer, as described elsewhere herein. The ability to use one or more of the interfaces provided by the interface processor 116 is particularly advantageous as it allows multiple ways of accessing the same data.

At 302, the storage controller 106 receives a request from an application 102, the request indicating one or more operations to perform with respect to data. In some instances, the request may include a storage request that causes data to be written to or read from the storage media 122, for example, a storage request may include a standard write request, a write compressed request, a standard read request, or a read compressed request. In some instances, the request may include an application request that accesses the compression or decompression capability of a storage device 105 (e.g., of the storage controller) without interacting with the storage media 122, for example, an application request may include a compress buffer request or a decompress buffer request.

At 304, the storage controller 106 determines whether the request includes a standard write request. If the storage controller 106 determines that the request includes a standard write request then, at 306, the storage controller 106 receives uncompressed data and, at 308, performs a standard write operation. In some implementations, a standard write operation includes writing the uncompressed data to the storage media 122. In some implementations, the standard write operation may include data reduction and/or deduplication, where the uncompressed data is compressed or deduplicated prior to being stored in the storage media 122. An example implementation of a standard write operation is described in reference to FIG. 4.

At 310, the storage controller 106 determines whether the request includes a write compressed request. If the storage controller 106 determines that the request includes a write compressed request then, at 312, the storage controller 106 receives a container 202 (e.g., from the application 102 or operating system 104) including a compressed payload 210 and metadata 204 and/or 206. At 314, the storage controller 106 stores the compressed payload 210 and metadata 204 and/or 206. For example, the storage controller 106 may store the compressed data of the compressed payload 210 in the storage media 122 and the metadata 204 and/or 206 in either the storage media 122, or the metadata 204 and/or 206 may be stored in the working memory of the system 100.

In some implementations, a write compressed operation corresponding to a write compressed request may be used during a restore of backed up data. For example, using the write compressed operation, data backed up to another location (e.g., to a separate storage media or node) may be restored to the storage media 122 without having to decompress the data. The write compressed operation is similar to a standard write, but it accepts already compressed data and does not need to re-compress the data for storage. In some implementations, the write compressed operation may receive the metadata 204 and 206 and store the attributes of the metadata 204 and 206 in appropriate storage structures (e.g., a forward map, a reverse map, a metalog, etc.) for future access, such as by a standard read request.

For example, the write compressed operation may include unpacking the container 202 according to the types of data contained therein. The storage controller 106 may determine which parts of the container 202 include the compressed payload 210, fixed size metadata 204, variable size metadata 206, and/or any types of data contained therein, depending on the implementation. The storage controller 106 may store the appropriate metadata 204 and 206 in the appropriate data structures in the storage media 122 or operating memory of the storage controller 106. For example, the storage controller 106 may store the state of a reference block (e.g., as described elsewhere herein) in the storage media 122 along with the compressed payload 210. The storage controller 106 may store the attributes describing the decompressed form of the compressed payload 210 in data structures, such as a forward or reverse map, in the working memory of the storage controller 106 or, in some instances, the working memory associated with the operating system 104 and/or application 102, or the attributes may be stored in the storage media 122.

At 316, the storage controller 106 determines whether the request is for a standard read operation. If the storage controller 106 determines that the request includes a standard read request then, at 318, the storage controller 106 performs a standard read operation and, at 320, returns uncompressed data to the application 102. In some implementations, if the data being read is encoded or compressed, it may be decompressed by the storage controller 106 as part of the standard read operation prior to returning the data to the application 102. For example, decompression of the data may include using a reference block to reduplicate the compressed data. In some implementations, as described above, the container 202 may have both the reference data (e.g., reference blocks, reference block state 208n), so that when the container 202 is transferred to a second storage device, the reference data is available for reduplication.

At 322, the storage controller 106 determines whether the request is for a read compressed operation. If the storage controller 106 determines that the request includes a read compressed request then, at 318, the storage controller 106 performs a read compressed operation and, at 320, returns a container 202 with a compressed payload 210 and metadata 204 and 206 to the application 102, as described elsewhere herein. In some implementations, the storage controller 106 finds and/or generates the attributes of the fixed size metadata 204 and/or variable size metadata 206 and attaches them as fixed and variable size metadata 204 and 206 to the compressed payload 210. For example, the storage controller 106 and/or an application 102, may access the appropriate data structures (e.g., a forward map, a reverse map, a metalog, etc.) and use the data therein to attach the metadata 204 and/or 206 to the compressed payload 210 in the container 202.

In some implementations, the read compressed request may be used during backup. For example, an application 102 may request a read compressed operation. The storage controller 106 generates the container 202 and transmits it to the application 102, which may then use the container 202 to transfer the compressed data and associated attributes to a different storage medium for backup. Thus, the data can be transferred in reduced form and bandwidth consumption is reduced. An example implementation of the read compressed operation is described in further detail in reference to FIG. 5.

At 328, the storage controller 106 determines whether the request is for a compress buffer operation. If the storage controller 106 determines that the request includes a compress buffer request then, at 330, the storage controller 106 receives uncompressed data, for example, from the application 102 or the operating system 104. At 332, the storage controller 106 performs a compress buffer operation and, at 334 returns the container 202 with the compressed payload 210 and metadata 204 and 206 to the application 102. An example implementation of the compress buffer operation is described in further detail in reference to FIG. 6. A compress buffer interface, as described herein, provides access to a compression capability built in to the storage controller 106 without reading or writing data to the storage media 122 by providing access to the compress buffer operation. For example, while compression and storage of the compressed data is generally seen by the operating system 104 as a single operation, a modular implementation, such as provided by the techniques described herein, allows more storage controller 106 capabilities to be available to applications 102 without necessarily consuming additional CPU resources (e.g., compression may be shared between a compression engine used for providing compression as a service and a capability of the storage device 105).

At 336, the storage controller 106 determines whether the request is for a decompress buffer operation. If the storage controller 106 determines that the request includes a decompress buffer request then, at 338, the storage controller 106 receives a container 202 including a compressed payload 210 and metadata 204 and 206. At 340, the storage controller 106 performs a decompress buffer operation and, at 342, returns the uncompressed data (and, in some instances, attributes from the metadata 204 and/or 206) to the application 102. The decompress buffer operation may decompress the received compressed data using the storage controller 106 prior to returning the uncompressed data to the application 102. For example, decompression of data may include using a reference block state 208n and corresponding reference block to reduplicate the compressed data or otherwise reproduce original data. For example, the storage controller 106 may determine the reference block state 208n from the fixed size metadata 204 or variable size metadata 206 of the container 202 and then retrieve the appropriate reference blocks to reduplicate the compressed payload 210. For example, in some implementations, the reference block state 208n may include a pointer to a location of a reference block, which pointer allows the storage controller 106 and/or an application 102 to retrieve the reference block (e.g., from a storage media 122 on the same storage device 105 or on a remote storage device 106) for use in reduplicating the compressed payload 210. In another example implementation, the reference block state 208n may include the reference block itself, which may be used for reduplication of the compressed payload 210. A decompress buffer interface, as described herein, provides access to a decompression capability built in to the storage controller 106 without reading or writing data to the storage media 122 by providing access to the decompress buffer operation.

It should be noted that one or more of the operations described in FIG. 3 can be combined as another interface. For example, an interface may correspond to both a standard write operation and a read compressed operation. Such an interface may accept uncompressed data, write the uncompressed data to the storage medium 122, and read back a container 202 with a compressed payload 210 and metadata 204 and 206 (compression may be performed on the write or the read side of the operation). It should also be noted that it is possible to return the container 202 before the write operation to the storage media 122 has competed (e.g., as in a combination of a standard write operation and a compress buffer operation). Another example of a combined interface may correspond to both a compressed write operation and a standard read operation. Such an interface may accept a container 202 with compressed data 210, store or otherwise use the metadata 204 and/or 206, store the compressed payload 210 in the storage media 122, and read back a decompressed form of the compressed payload 210 (e.g., by the storage controller 106 decompressing the data during the standard read operation, as described elsewhere herein) to the application 102.

Figure 4:
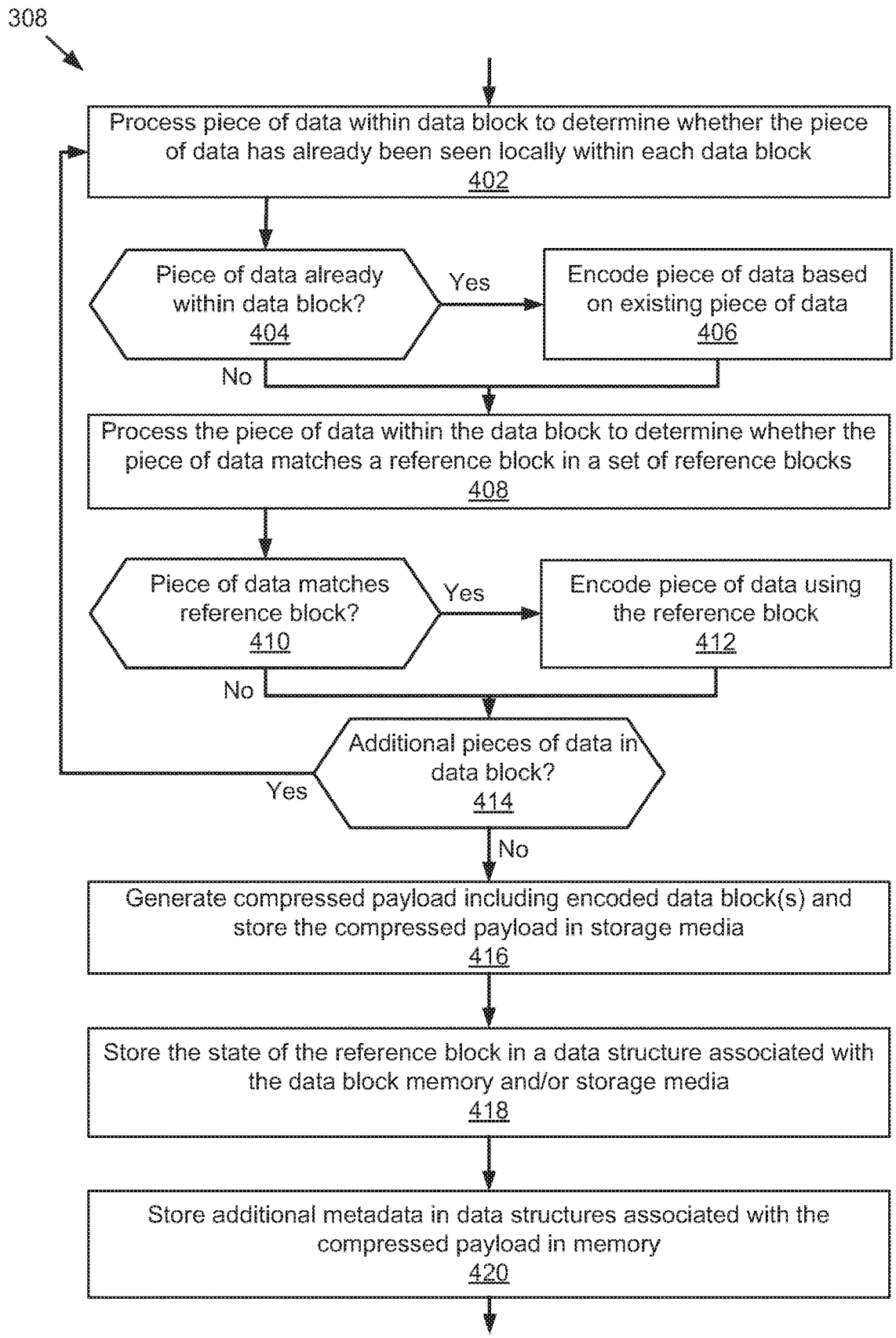
FIG. 4 is a flow chart of an example method for generating a compressed payload.

FIG. 4 is a flow chart of an example method 308 including a standard write operation with data reduction. The method 308 of FIG. 4 further describes an example of encoding a compressed payload 210 according to the techniques described herein. It should be understood that, although the term "standard" is used, inventive techniques may be described herein. It should also be noted that the particular method of deduplication described in FIG. 4 is not required for a standard write operation and other forms of compression or the absence thereof are possible with a standard write operation. For example, some implementations of the standard write operation include writing the uncompressed data (e.g., in raw form or a form other than described in FIG. 4) to the storage media 122 without compression or deduplication.

Additionally, FIG. 4 discloses a method for reducing the amount of bandwidth and storage used to store and transmit data by encoding the data using a compression algorithm. The compression techniques described in reference to FIG. 4 may be used in the other interfaces (e.g., those described in reference to FIG. 3), but are not repeated for each interface for clarity. Similarly, the compression techniques described in reference to FIG. 4 may include additional or fewer operations, for example, compression may include blocks 402 through 406, but not 408 through 412 or other techniques may include blocks 408-414, but not 402-406. Some instances of a compression/encoding algorithm may include, but are not limited to, delta encoding, resemblance encoding, and delta-self compression; however it should also be noted that these data reductions may not be required for a standard write operation.

In some implementations, the compression algorithm includes deduplication. For example, a similarity based deduplication technique may include an algorithm to detect similarity between data blocks using Rabin Fingerprinting and Broder's document matching schemes. Furthermore, similarity-based deduplication algorithms may operate by deducing an abstract representation of content associated with reference blocks. A reference block is a data structure that may be artificially or naturally created to keep track of the most recurring data blocks and may be used to encode and decode a data block. Thus, reference blocks can be used as templates for deduplicating incoming data blocks, leading to a reduction in total volume of data being stored. When deduplicated data blocks are recalled from storage, the encoded (e.g., deduplicated) representation can be retrieved from the storage and combined with information supplied by the reference block(s) to reproduce the original data block.

At 402, the storage controller 106 processes pieces of data (e.g., within a data block, received stream of data, retrieved file, etc.) to determine whether a piece of data has already been seen locally within each data block and, at 404, determines whether the piece of data is already within the data block. For example, the storage controller 106 may determine a similarity (e.g., whether a threshold level of similarity is met) between each piece of data (e.g., a defined quantity of data) and those pieces of data that were previously within the data block. At 406, the storage controller 106 encodes the piece of data and/or data block to specify that piece of data has already been seen within the data block.

In some instances, a data block may be a content defined chunk of data and the pieces of data reflect a granularity with which similarity of the data block with other data may be determined. For example, in some instances, a data block may be a 4 kilobyte chunk of data and the pieces of data reflect a 4 byte granularity with which similarity (e.g., internal or external to the data block) is determined.

At 408, the storage controller 106 processes the piece of data within the data block and, at 410, determines whether the piece of data matches a reference block (e.g., whether a threshold level of similarity is met).

For example, the storage controller 106 may analyze associated identifier information (e.g., digital signatures, fingerprints, etc.) of the piece of data and/or data block by parsing a data store for one or more matching reference blocks. In some implementations, the storage controller 106 applies a similarity based algorithm to detect similarities between incoming data and data previously stored in the storage media 122. For example, the storage controller 106 may identify a similarity between incoming data and previously stored data using resemblance hashes (e.g., hash sketches). The similarities may include, but are not limited to, a degree of similarity between data content (e.g. content-defined chunks of each data block) and/or identifier information associated with each data block or piece of data.

At 412, the storage controller 106 encodes the piece of data using the reference block. At 414, the storage controller 106 determines whether there are additional pieces of data in a data block to be processed. In some implementations, encoding can happen at different levels of granularity. For example, a piece of data may be an entire data block. It should also be noted that a data stream or file to be compressed may include a plurality of data blocks.

At 416, the storage controller 106 generates a compressed payload (e.g., a compressed payload 210) including the encoded data block(s). For example, the compressed payload 210 may be written to the storage media 122 as part of the standard write operation.

At 418, the storage controller 106 may store the state of the reference block in a data structure associated with the data block, for example, as described elsewhere herein. Each deduplicated data block in the compressed payload 210 is associated with the reference block(s) against which it was reduced, so that the deduplicated data can be correctly assembled back into its original form on subsequent recall. The state of the reference block may include which reference blocks were used to encode and generate the compressed payload 210. In some implementations, the state of the reference block may include the content of the reference block, the actual reference block, a pointer or index identifying the reference block, etc.

At 420, the storage controller 106 may store additional metadata in data structures associated with the compressed payload 210. For example, the storage controller 106 may store metadata (e.g., data that corresponds to the fixed size metadata 204 and/or variable size metadata 206) in data structures in operating memory (e.g., memory of the storage device 105) such as forward map, reverse map, metalog, etc., where the metadata can be used by the application 102 or used to generate the container 202. In some instances, the metadata may include media metadata. Media metadata is any metadata that describes attributes of the storage media 122 or storage of the compressed payload 210 or container 202 as they relate to the storage media 122. For example, media metadata may include media attributes such as locality hints, garbage collection hints, reference block state, reference counts, etc. The media metadata may form part of the fixed size metadata 204 and/or the variable size metadata 206.

Figure 5:
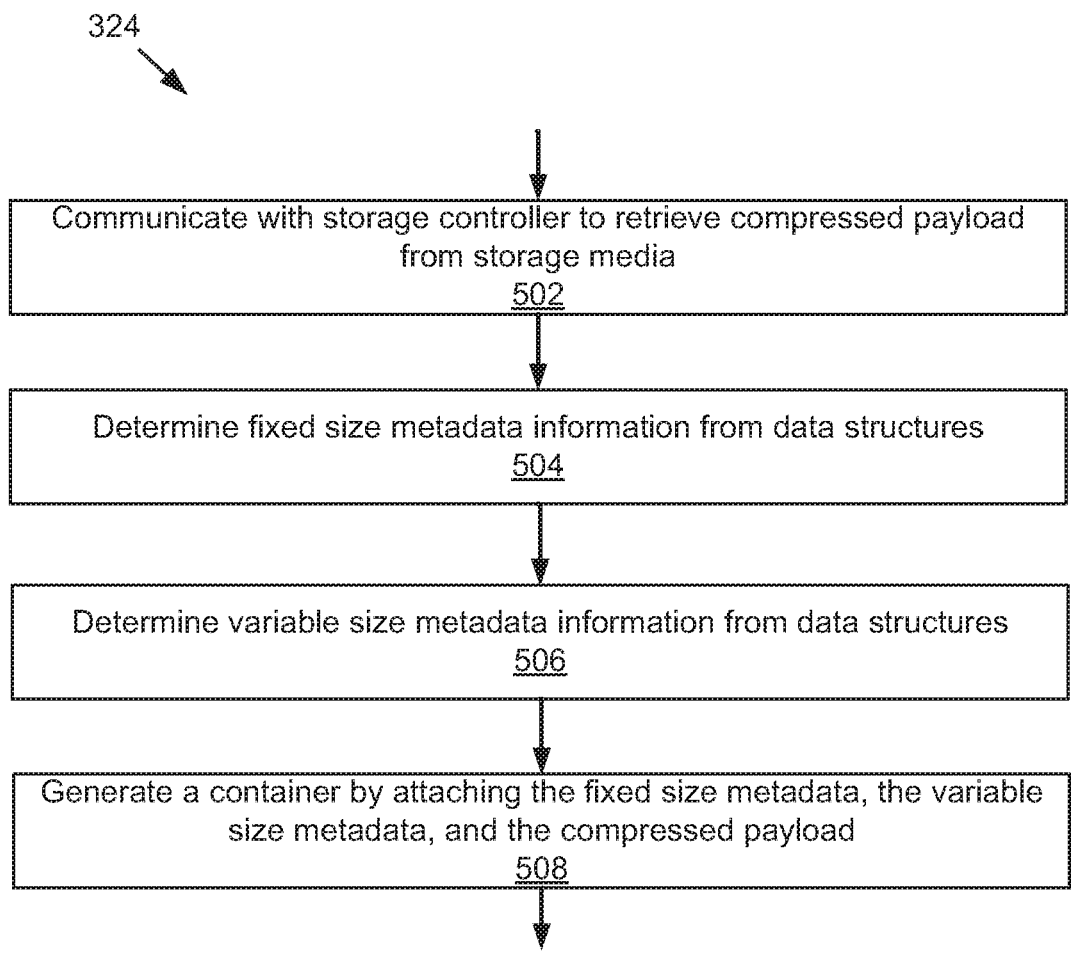
FIG. 5 is a flow chart of an example compressed read method.

FIG. 5 is a flow chart of an example method 324 for a read compressed operation. In particular, the method 324 provides a new interface for retrieving compressed data from a storage media 122 for use or transmittal by an application 102. At 502, the application 102 communicates with the storage controller 106 to retrieve the compressed payload 210, or alternatively, the storage controller 106 receives the read compressed request via the storage protocol 124 and the storage controller 106 communicates with the storage media 122 (e.g., as described above) to retrieve the compressed payload 210 from the storage media 122. The compressed payload 210 may have been stored to the storage media 122 previously. For example, the compressed payload 210 may have been stored to the storage media 122 using a standard write operation or a write compressed operation.

In some implementations, the data stored in the storage media 122 is compressed as part of the read compressed operation (e.g., whether the data is stored in the storage media 122 in either compressed or uncompressed form). For example, the method 324 for a read compressed operation may include the compression/deduplication operations (e.g., 402-414) described in reference to FIG. 4.

At 504, the storage controller 106 may determine fixed size metadata 204 information from data structures associated with the compressed payload 210. For example, the attributes of the fixed size metadata 204 may be retrieved from those data structures in which it was stored as part of another operation, such as the standard write operation at 418 and/or 420 of FIG. 4, as described above. Additionally or alternatively, the storage controller 106 may determine the attributes for the fixed size metadata 204 by analyzing the compressed payload 210 or the uncompressed data prior to compression.

At 506, the storage controller 106 may determine variable size metadata information from data structures associated with the compressed payload 210, as discussed above. For example, the variable size metadata 206 and/or attributes stored therein, may be retrieved from those data structures in which it was stored as part of another operation, such as the standard write operation at 418 and/or 420 of FIG. 4. Additionally or alternatively, the storage controller 106 may determine the attributes 208 described with reference to the variable size metadata 206 by analyzing the compressed payload 210 or the uncompressed data prior to compression into the compressed payload 210.

For example, if the compressed payload 210 is transmitted (e.g., by the application 102 in a read compressed operation) the reference block against which the original block was deduplicated (e.g., as described above) may be made available, so that the original data corresponding to the compressed payload 210 can be recreated (e.g., by reduplication), because the deduplication and reduplication may depend on the state of the reference block. Thus, when the metadata 204 and/or 206 is attached to the compressed payload 210, the reference block may be made available for future reduplication of the compressed payload 210 by a storage controller 106 and/or application 102. For example, the system 100 may support backing up or transferring, along with the compressed payload 210, all of the reference blocks in a set or just the reference blocks used for deduplication of the compressed payload 210 (e.g., a backup application may also back up the reference blocks to the same location or another accessible location as the compressed payload 210, for example, based on the reference block state 208n). In another example, the state of the reference block includes an instruction to retrieve the reference block, such as a pointer or index to a place where the reference block is stored.

At 508, the storage controller 106 may construct or generate a container 202 by attaching the fixed size metadata 204 and the variable size metadata 206 to the compressed payload 210. For example, the container 202, fixed size metadata 204, variable size metadata 206, and compressed payload 210 are described in further detail in reference to the format 200 in FIG. 2.

Figure 6:
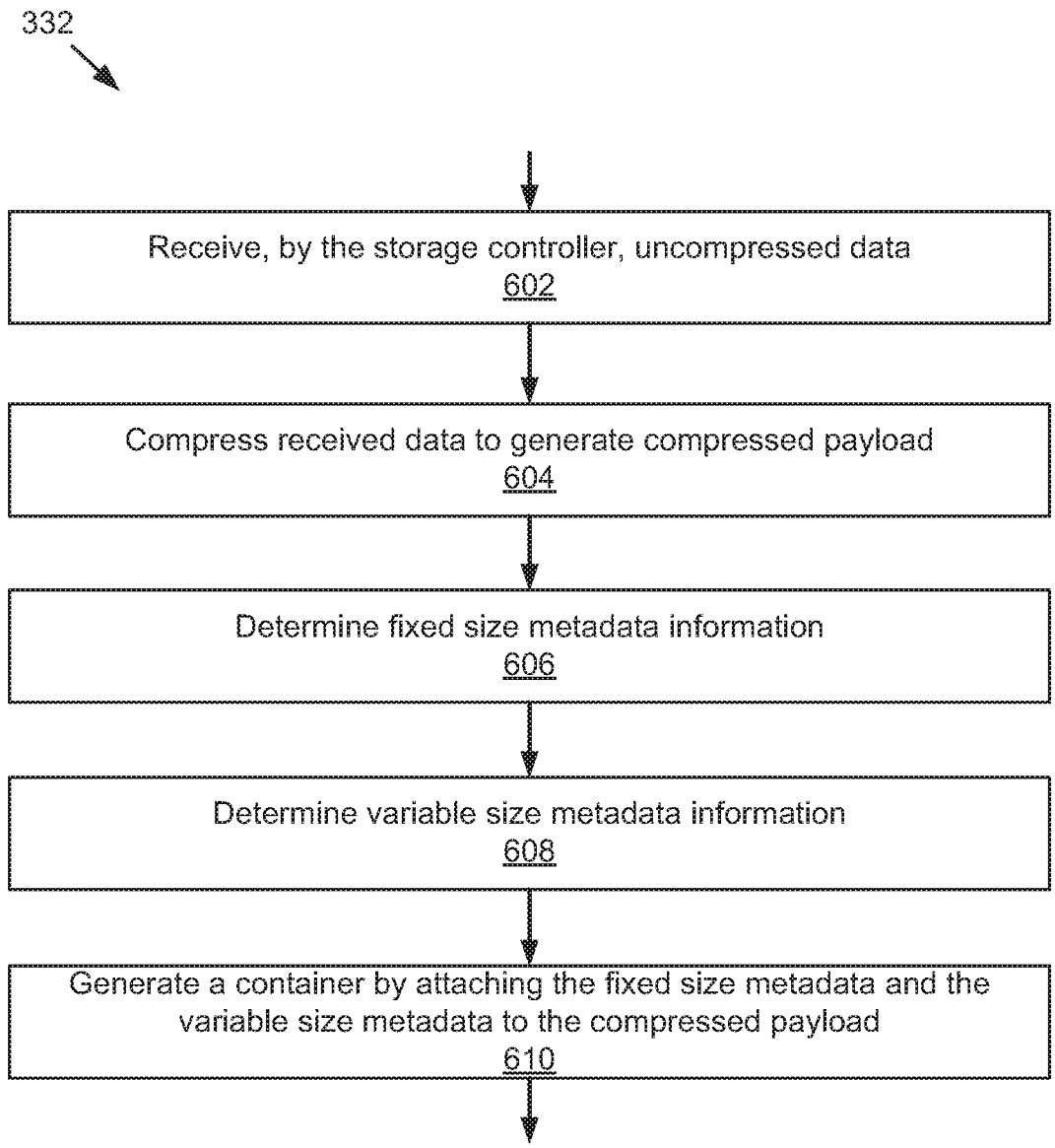
FIG. 6 is a flow chart of an example compressed write method.

FIG. 6 is a flow chart of an example method 332 for a compress buffer operation. In particular, the method 332 provides a new interface for using compression capabilities built in to a storage controller 106 without having to read from or write the uncompressed or compressed data to the storage media 122. In some implementations, the compress buffer operation essentially combines a standard write operation and a read compressed operation without writing the data to the storage media 122.

At 602, the storage controller 106 receives uncompressed data, which may accompany the compress buffer request. As such, an application 102 can use the compression (and controller 202 creation) capabilities of a storage device 105 (e.g., including a storage controller 106) as a service to compress and decompress data without necessarily expending additional CPU time (e.g., if the application 102 and/or operating system 104 use a separate processor from the storage controller 106) or writing data to the storage media 122.

At 604, the storage controller 106 compresses the received data to generate a compressed payload 210. For example, the compression may be performed using the techniques described in FIG. 4 (e.g., 402-414). At 606, the storage controller 106 may determine fixed size metadata 204 information from data structures associated with the received data, information received with the received data or request, and/or an analysis of the received data in the same or similar way as is described in reference to block 504 in FIG. 5. Similarly, at 608, the storage controller 106 may determine variable size metadata 206 information from data structures associated with the received data, information received with the received data or request, and/or an analysis of the received data in the same or similar way as is described in reference to block 506 in FIG. 5. At 610, the storage controller 106 generates a container 202 by attaching the fixed size metadata 204 and the variable size metadata 206 to the compressed payload 210 in the same or similar way as is described in reference to block 508 in FIG. 5.

Systems and methods for providing a system for efficiently managing data with compression interfaces are described herein. In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types.

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing," "computing," "calculating," "determining," "displaying," or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies, and other aspects are not mandatory or significant, and the mechanisms that implement the present techniques and technologies or its features may have different names, divisions, and/or formats. Furthermore, the modules, routines, features, attributes, methodologies, and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A system comprising:
    a non-transitory storage medium for storing and providing access to data;
    an interface processor coupled to an application, the interface processor configured to receive a read compressed request from the application; and
    a controller logic coupled to an output of the interface processor, the controller logic configured to, responsive to receiving the read compressed request:
        retrieve a compressed payload from the non-transitory storage medium;
        generate a data container having a data container format and including the compressed payload;
        determine attributes of a fixed size metadata;
        determine attributes of a variable size metadata;
        attach, as metadata to the data container, the fixed size metadata and the variable size metadata; and
        return the data container having the data container format and including the compressed payload, the fixed size metadata, and the variable size metadata to the application for integrity verification.

2. The system of claim 1, wherein; the fixed size metadata includes data that is opaque to the application; and the variable size metadata includes data interpretable by the application.

3. The system of claim 1, wherein the metadata includes validity check information for verifying an integrity of the compressed payload, the validity check information for verifying the integrity of the compressed payload being configured to be interpreted by the application.

4. The system of claim 1, wherein the metadata includes validity check information for verifying an integrity of an uncompressed form of the compressed payload, the validity check information for verifying the integrity the uncompressed form of the compressed payload being configured to be opaque to the application.

5. The system of claim 1, wherein the controller logic is further configured to, prior to receiving the read compressed request:
encode data into the compressed payload using data deduplication; and
store the compressed payload in the non-transitory storage medium.

6. The system of claim 5, wherein encoding the data into the compressed payload includes:
processing a data block of the data, the data block comprising a plurality of pieces of data;
determining whether a second piece of data of the plurality of pieces of data has a first threshold level of similarity to a first piece of data of the plurality of pieces of data;
determining whether the second piece of data has a second threshold level of similarity to a reference block, the reference block representing a piece of data that is not in the data block; and
encoding the data block based on the determination that the second piece of data has the first threshold level of similarity to the first piece of data and the determination that the second piece of data has the second threshold level of similarity to the reference block.

7. The system of claim 5, wherein;
the interface processor is executable to receive a query from the application for a stream of data, the stream of data including compressed data;
the controller logic is executable to;
determine an oldest reference set for the compressed data, the oldest reference set including at least one reference block;
insert the at least one reference block of the oldest reference set into the variable size metadata; and
construct one or more second data containers using data blocks that refer to the oldest reference set; and
the interface processor is executable to transmit the one or more second data containers to the application.

8. The system of claim 7, wherein:
the controller logic is further executable to, in response to all data blocks referring to the oldest reference set being inserted into the one or more second data containers;
determine a next oldest reference set, the next oldest reference set including at least one second reference block;
insert the at least one second reference block of the next oldest reference set into the variable size metadata; and
insert data blocks that refer to the next oldest reference set into the one or more second data containers.

9. The system of claim 1, wherein the fixed size metadata includes data that is interpretable by the application to allow the application to interpret the variable size metadata.

10. A method comprising:
receiving, by an interface processor coupled to an application, a read compressed request from the application;
responsive to receiving the read compressed request, retrieving, by a controller logic coupled to an output of the interface processor, a compressed payload from a non-transitory storage medium;
generating a data container having a data container format and including the compressed payload;
determining attributes of a fixed size metadata;
determining attributes of a variable size metadata;
attaching, as metadata to the data container, the fixed size metadata and the variable size metadata; and
returning the data container having the data container format and including the compressed payload, the fixed size metadata, and the variable size metadata to the application for integrity verification.

11. The method of claim 10, wherein; the fixed size metadata includes data that is opaque to the application; and the variable size metadata includes data interpretable by the application.

12. The method of claim 10, wherein the metadata includes validity check information for verifying an integrity of the compressed payload, the validity check information for verifying the integrity of the compressed payload being configured to be interpreted by the application.

13. The method of claim 10, wherein the metadata includes validity check information for verifying an integrity of an uncompressed form of the compressed payload, the validity check information for verifying the integrity the uncompressed form of the compressed payload being configured to be opaque to the application.

14. The method of claim 10, further comprising:
prior to receiving the read compressed request, encoding, by the controller logic, data into a compressed payload using data deduplication; and
storing the compressed payload in the non-transitory storage medium.

15. The method of claim 14, wherein encoding the data into the compressed payload includes:
processing a data block of the data, the data block comprising a plurality of pieces of data;
determining whether a second piece of data of the plurality of pieces of data has a first threshold level of similarity to a first piece of data of the plurality of pieces of data;
determining whether the second piece of data has a second threshold level of similarity to a reference block, the reference block representing a piece of data that is not in the data block; and
encoding the data block based on the determination that the second piece of data has the first threshold level of similarity to the first piece of data and the determination that the second piece of data has the second threshold level of similarity to the reference block.

16. The method of claim 14, further comprising;
querying, by the application, the interface processor for a stream of data, the stream of data including compressed data;
determining, by the controller logic, an oldest reference set for the compressed data, the oldest reference set including at least one reference block;

inserting, by the controller logic, the at least one reference block of the oldest reference set into the variable size metadata;
constructing, by the controller logic, one or more second data containers using data blocks that refer to the oldest reference set; and
transmitting, by the interface processor, the one or more second data containers to the application.

17. The method of claim 16, further comprising:
in response to all data blocks referring to the oldest reference set being inserted into the one or more second data containers;
determining, by the controller logic, a next oldest reference set, the next oldest reference set including at least one second reference block;
inserting, by the controller logic, the at least one second reference block of the next oldest reference set into the variable size metadata; and
inserting, by the controller logic, data blocks that refer to the next oldest reference set into the one or more second data containers.

18. The method of claim 10, wherein the fixed size metadata includes data that is interpretable by the application to allow the application to interpret the variable size metadata.

19. A system comprising:

means for storing and providing access to data;

means for receiving a read compressed request from an application; and means for receiving the read compressed request, and responsive to receiving the read compressed request, retrieving a compressed payload from a non-transitory storage medium, generating a data container having a data container format and including the compressed payload, determining attributes of a fixed size metadata, determining attributes of a variable size metadata, attaching, as metadata to the data container, the fixed size metadata and the variable size metadata, and returning the data container having the data container format and including the compressed payload, the fixed size metadata, and the variable size metadata to the application for integrity verification.

20. The system of claim 19, wherein; the fixed size metadata includes data that is opaque to the application; and the variable size metadata includes data interpretable by the application.

* * * * *